Patented June 26, 1934

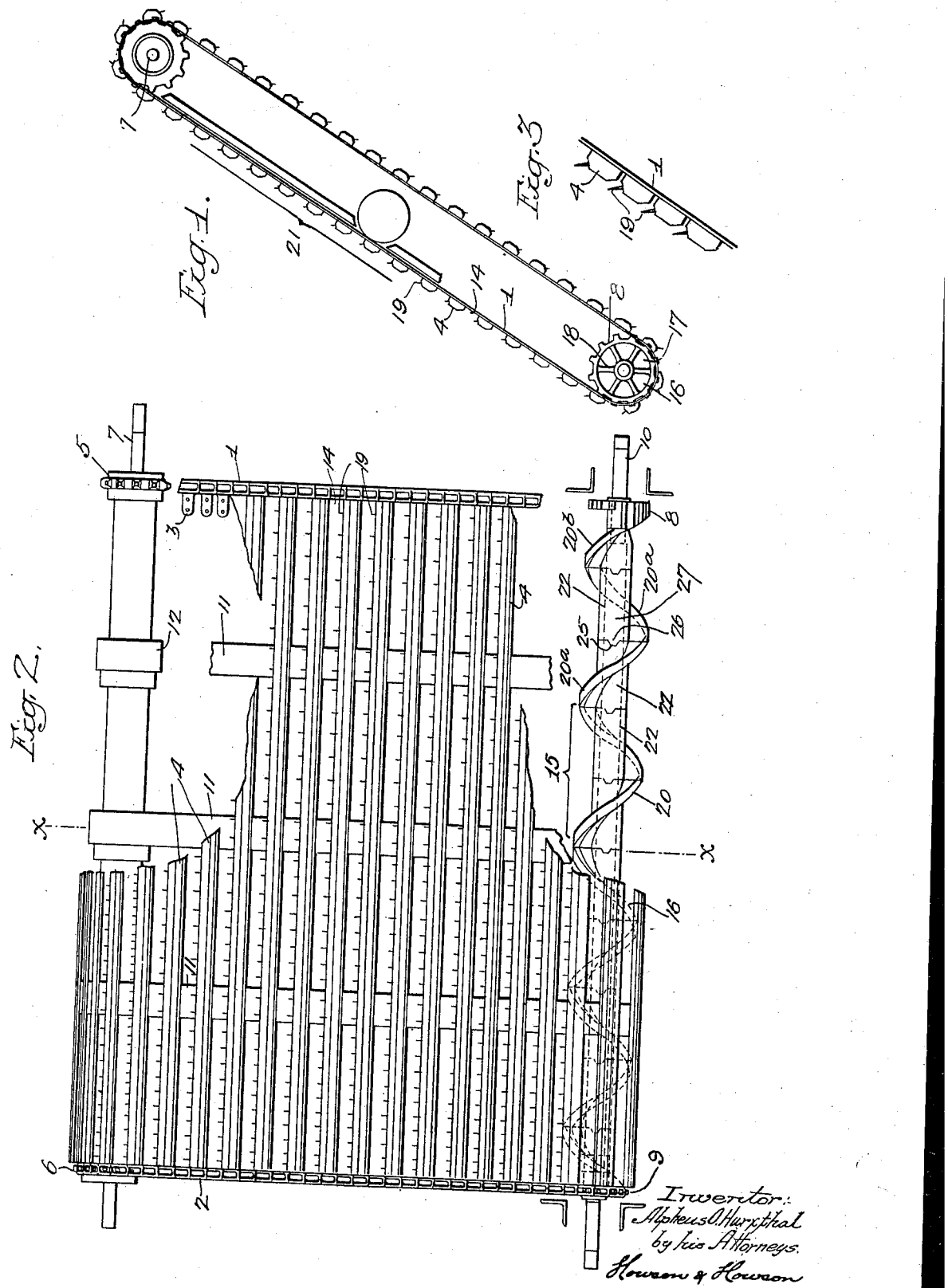

1,964,637

UNITED STATES PATENT OFFICE 1,964,637

CONVEYER

Alpheus O. Hurxthal, Philadelphia, Pa., assignor to Proctor & Schwartz, Incorporated, Philadelphia, Pa., a corporation of Pennsylvania Application February 19, 1932, Serial No. 594,123

11 Claims. (Cl. 198—230)

This invention relates to conveyers, and particularly to automatic conveyers for fibrous materials when arranged in an inclined plane for feeding material from a hopper to a relatively elevated mechanism such as the conveyer of a drier or other processing apparatus through which the material is to be carried.

Automatic feed conveyers of the type noted usually consist of a plurality of transversely extending substantially parallel slats arranged in either relatively close adjacent relation to each other or in relatively spaced relation, the slats being respectively attached at their opposite ends, and at points intermediate the side edges of the conveyer, to relatively spaced link belts or continuous bands passing around driving and guide sprockets, rollers or other wheels arranged to maintain the conveyer in the correct inclined plane to automatically feed the material from the hopper to the relatively elevated mechanism above noted.

In the course of usage some of the fibrous material, and particularly fine particles thereof commonly known as "fly", pass between the slats and fall into the lower turn of the conveyer. In time the material within the lower turn of the conveyer accumulates to such an extent that it becomes packed tightly in and on the teeth of the sprockets and on the peripheral surfaces of such sprockets, rollers or other wheels, around which the belts or bands pass so that the slats are forced loose from the chains or bands. The accumulated material also builds up on the said peripheral surfaces of the sprockets or wheels to such extent that their effective diameters are so materially increased that the chains or bands passing around the same are placed under excessive tension, resulting in the breaking of one or more of the chains or bands or causing excessive wear in the bearings that rotatably support the shafts on which the sprockets, rollers or other wheels are mounted.

The object of the present invention is to provide means for preventing the accumulation of material in the lower turn of the inclined feed conveyer.

The construction and operation of the mechanism forming the subject of the present invention will be fully disclosed hereinafter, reference being had to the accompanying drawing, of which:

Fig. 1 is a side elevation of the feed conveyer;

Fig. 2 is a front elevation of the conveyer shown in Fig. 1 with portions broken away for the purpose of more clearly disclosing the invention; and Fig. 3 illustrates an alternative arrangement of slats on the carrying elements.

The feed conveyer in the present instance comprises a pair of laterally spaced endless link belts or chains 1 and 2 respectively, each provided with inwardly extending lugs 3 to which are secured the opposite ends of relatively spaced slats 4, 4 respectively. The slat-carrying elements 1 and 2 in the present instance pass around laterally spaced toothed sprockets 5 and 6 mounted on a common shaft 7, and around correspondingly laterally spaced toothed sprockets 8 and 9 mounted on a common shaft 10.

Intermediate the side chains 1 and 2, the slats are secured to relatively spaced continuous bands 11, 11, which pass around wheels or rollers 12 mounted on the upper shaft 7 and around the periphery of a screw conveyer 15 mounted on the lower shaft 10 intermediate the sprockets 8 and 9.

As shown in Fig. 2, the screw conveyer 15 is pitched in opposite directions from the center $x, x$ of the conveyer toward the opposite side edges thereof.

As the apron conveyer operates, the shaft 10 and the screw conveyer 15 thereon are rotated. Any material which may have passed through the spaces 14 between the adjacent slats 4, 4 of the apron conveyer, and which has fallen into the lower turn 16 of the apron conveyer, will be moved laterally toward the opposite sides respectively of the apron conveyer and passed out through the spaces 17 of the sprockets 8 and 9, by the spiral fin 20 of the screw conveyer 15. The material will then fall from the outer side edges of the apron conveyer back into the hopper (not shown) in which the lower turn 16 of the apron conveyer is disposed.

Each of the slats 4 is provided with a series of pins or teeth 19 which are adapted to bite into the fibrous material in the hopper and to carry the material on and with the uppermost inclined run 21 of the apron conveyer.

In the present instance, the screw conveyer 15 is composed of a plurality of sections 22, 22, each of which includes a segmental portion of the spiral fin 20, i. e. substantially one-half of one convolution including approximately a 180° segment of the spiral fin, as illustrated at 20a.

Each of the sprockets 8 and 9 includes a segmental section of the spiral fin 20 approximating a 90° segment of one convolution of the spiral fin, as illustrated at 20b. Obviously, the sections 20b may be separate from the sprockets 8 and 9 if desired.

The various sections of the screw conveyer 15 are provided with means for preventing relative rotation therebetween to maintain continuity in the pitch of the spiral fin 20, and for this purpose one section is provided with a socket, such as that illustrated at 25, while the adjacent section is provided with a lug 26 arranged to fit within the socket 25 in the end of the hub 27 of the next adjacent section 22.

I claim:

1. The combination of a belt conveyer, guides at the opposite sides of said belt respectively around which the belt passes in the form of a turn, and a screw conveyer affording transverse support for the turning portion of the belt conveyer and operating within said turn to discharge material from within said turn at one side of the belt.

2. The combination of a belt conveyer, guides at the opposite sides of said belt respectively around which the belt passes in the form of a turn, and a screw conveyer affording transverse support for the turning portion of the belt conveyer and operating within said turn and pitched in opposite directions from the center of the belt to discharge material from within said turn at opposite sides of the belt respectively.

3. The combination of a belt conveyer, guides at the opposite sides of said belt respectively around which the belt passes in the form of a turn, and a screw conveyer affording transverse support for the turning portion of the belt conveyer and operating within said turn and pitched in opposite directions from the center of the belt to discharge material from within said turn through openings formed in said guides at opposite sides of the belt respectively.

4. The combination of a belt conveyer comprising side elements and a body portion carried by and extending between said side elements, a rotary guide for and around which each of said side elements pass to form the body of the belt into a turn, said rotary guides being respectively provided with openings extending laterally therethrough, and a screw conveyer axially aligned with and disposed intermediate said rotary guides and pitched in opposite directions from the center of the belt to discharge material from within said turn through the openings in the rotary guides at the opposite sides of the belt respectively.

5. The combination of a belt conveyer comprising side elements and a body portion carried by and extending between said side elements, a rotary guide for and around which each of said side elements pass to form the body of the belt into a turn, said rotary guides being respectively provided with openings extending laterally therethrough, a screw conveyer axially aligned with and disposed intermediate said rotary guides and pitched in opposite directions from the center of the belt to discharge material from within said turn through the openings in the rotary guides at the opposite sides of the belt respectively, and a carrier element for the body of the belt disposed intermediate the said rotary guides and riding the periphery of the screw conveyer within said turn.

6. The combination of a belt conveyer comprising side elements and a body portion carried by and extending between said side elements, a rotary guide for and around which each of said side elements pass to form the body of the belt into a turn, said rotary guides being respectively provided with openings extending laterally therethrough, a screw conveyer axially aligned with and disposed intermediate said rotary guides and pitched in opposite directions from the center of the belt to discharge material from within said turn through the openings in the rotary guides at the opposite sides of the belt respectively, and a plurality of carrying elements spaced from and relative to the side elements and to each other for carrying the body of said belt intermediate said side elements, said intermediate carrying elements riding the peripheral surface of the screw conveyer within the turn of the belt.

7. The combination of a belt conveyer comprising a pair of relatively spaced side chains, a plurality of relatively spaced slats extending between and secured at their opposite ends respectively to said side chains, a shaft, a pair of sprockets in spaced relation on said shaft and around which said side chains respectively pass to form a turn in the belt, a screw conveyer axially aligned with and disposed intermediate said sprockets for discharging material from the turn beyond one side of the belt.

8. The combination of a belt conveyer comprising a pair of relatively spaced side chains, a plurality of relatively spaced slats extending between and secured at their opposite ends respectively to said side chains, a shaft, a pair of relatively open sprockets in spaced relation on said shaft and around which said side chains respectively pass to form a turn in the belt, a screw conveyer axially aligned with and disposed intermediate said sprockets for discharging material from the turn beyond one side of the belt through the open sprockets.

9. The combination of a belt conveyer comprising a pair of relatively spaced side chains, a plurality of relatively spaced slats extending between and secured at their opposite ends respectively to said side chains, a shaft, a pair of relatively open sprockets in spaced relation on said shaft and around which said side chains respectively pass to form a turn in the belt, a screw conveyer axially aligned with and disposed intermediate said sprockets and pitched in opposite directions from the center of the belt for discharging material from the turn beyond the opposite sides of the belt respectively through the open sprockets.

10. The combination of a belt conveyer comprising a pair of relatively spaced side chains, a plurality of relatively spaced slats extending between and secured at their opposite ends respectively to said side chains, a shaft, a pair of relatively open sprockets in spaced relation on said shaft and around which said side chains respectively pass to form a turn in the belt, a screw conveyer axially aligned with and disposed intermediate said sprockets and pitched in opposite directions from the center of the belt for discharging material from the turn beyond the opposite sides of the belt respectively through the open sprockets, said screw conveyer comprising a plurality of sections each including a segmental portion of the screw, and means for locking the sections together for maintaining continuity of the pitch of the screw throughout the plurality of sections.

11. The combination of a belt conveyer comprising a pair of relatively spaced side chains, a plurality of relatively spaced slats extending between and secured at their opposite ends respectively to said side chains, a shaft, a pair of relatively open sprockets in spaced relation on said shaft and around which said side chains respectively pass to form a turn in the belt, a screw conveyer axially aligned with and disposed intermediate said sprockets and pitched in opposite directions from the center of the belt for discharging material from the turn beyond the opposite sides of the belt respectively through the open sprockets, said screw conveyer comprising a plurality of sections each including a segmental portion of the screw, and means for locking the sections together for maintaining continuity of the pitch of the screw throughout the plurality of sections, said sprockets each including a screw portion forming a continuation of the pitch of the screw conveyer.

ALPHEUS O. HURXTHAL.